March 9, 1926. 1,575,894
W. T. AYER
MACHINE FOR MAKING PAPER SHELLS
Filed Sept. 18, 1923 6 Sheets-Sheet 1

WITNESS:

INVENTOR
William T. Ayer
BY
Frank S. Buser
ATTORNEY.

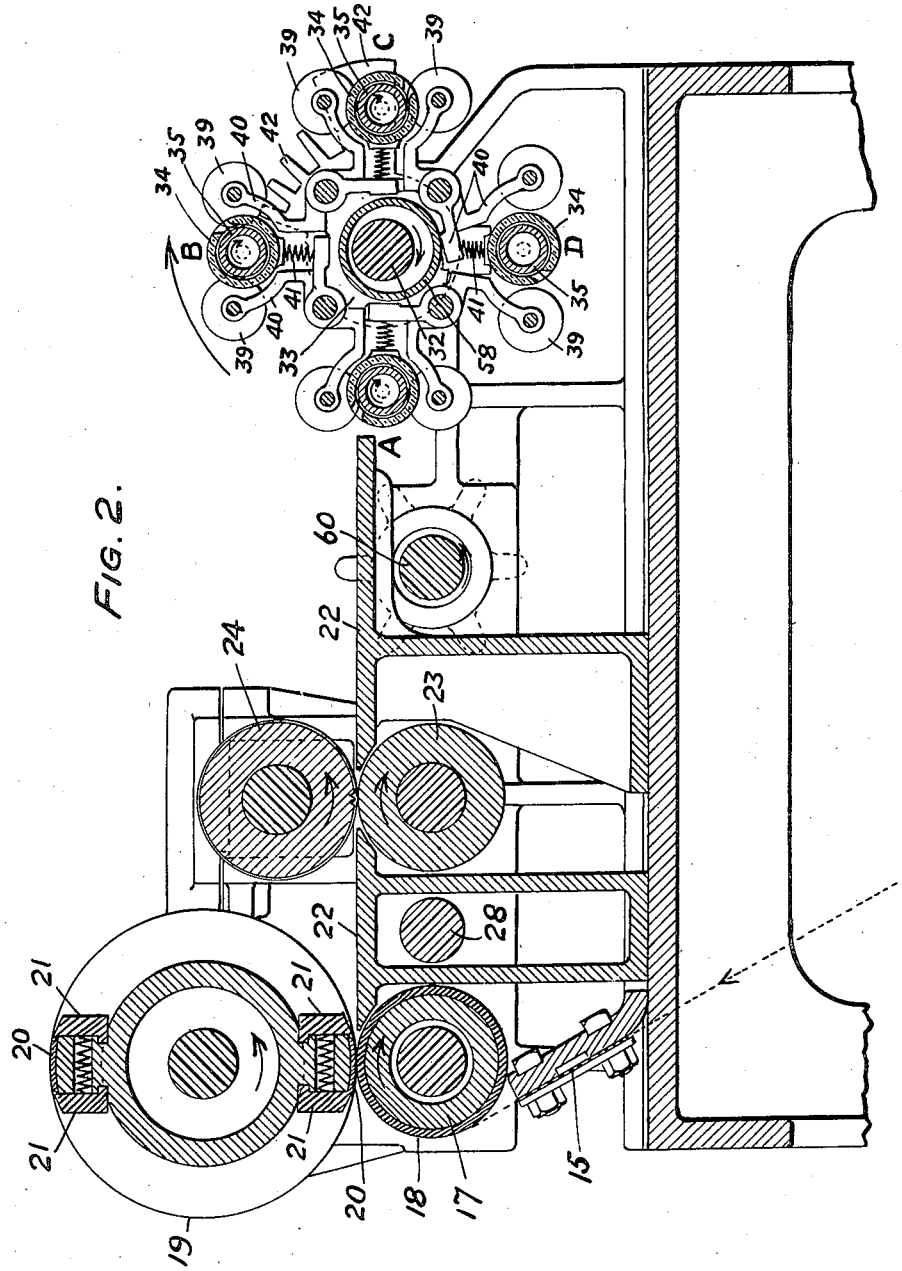

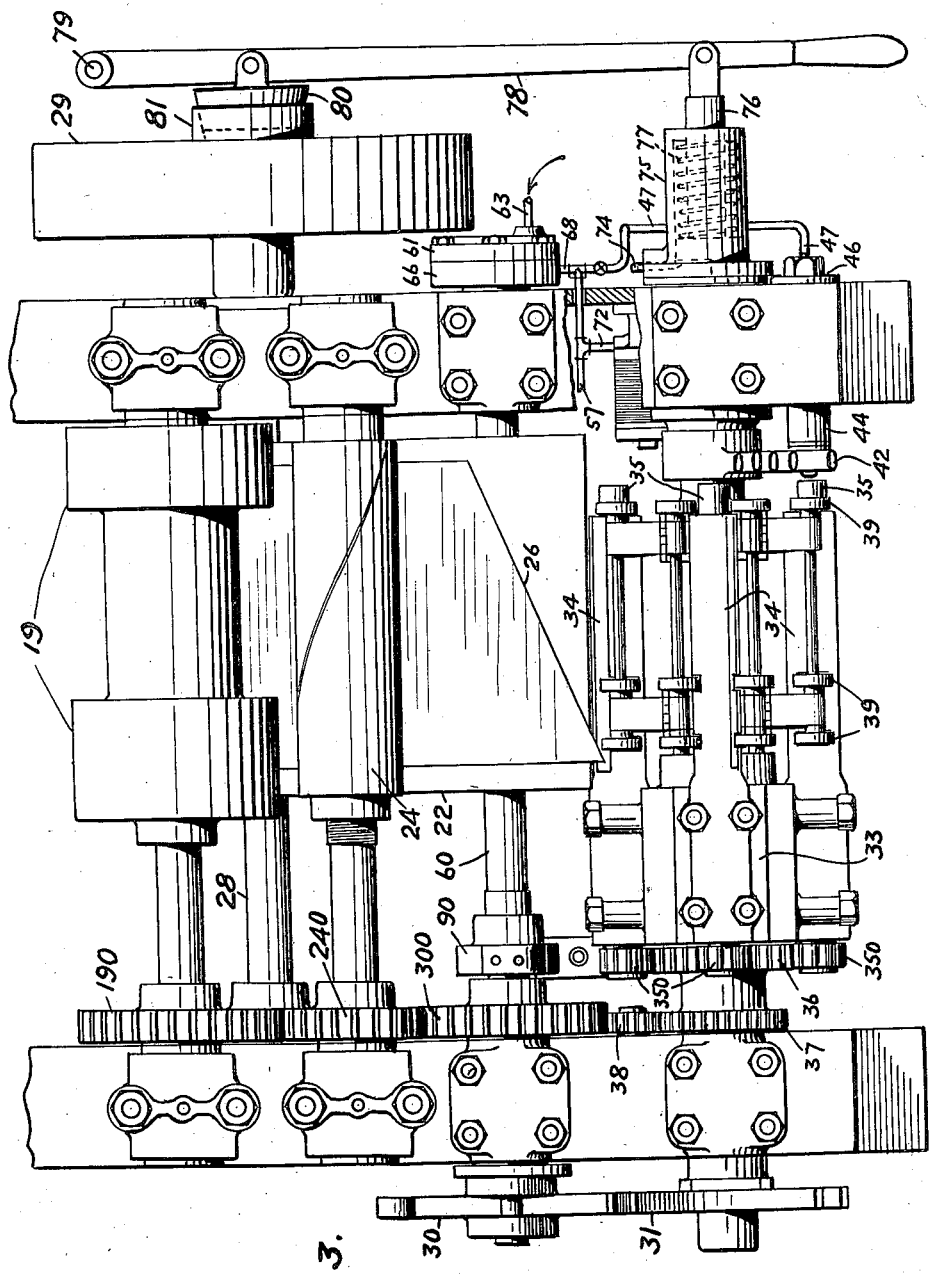

March 9, 1926.
W. T. AYER
1,575,894
MACHINE FOR MAKING PAPER SHELLS
Filed Sept. 18, 1923     6 Sheets-Sheet 4
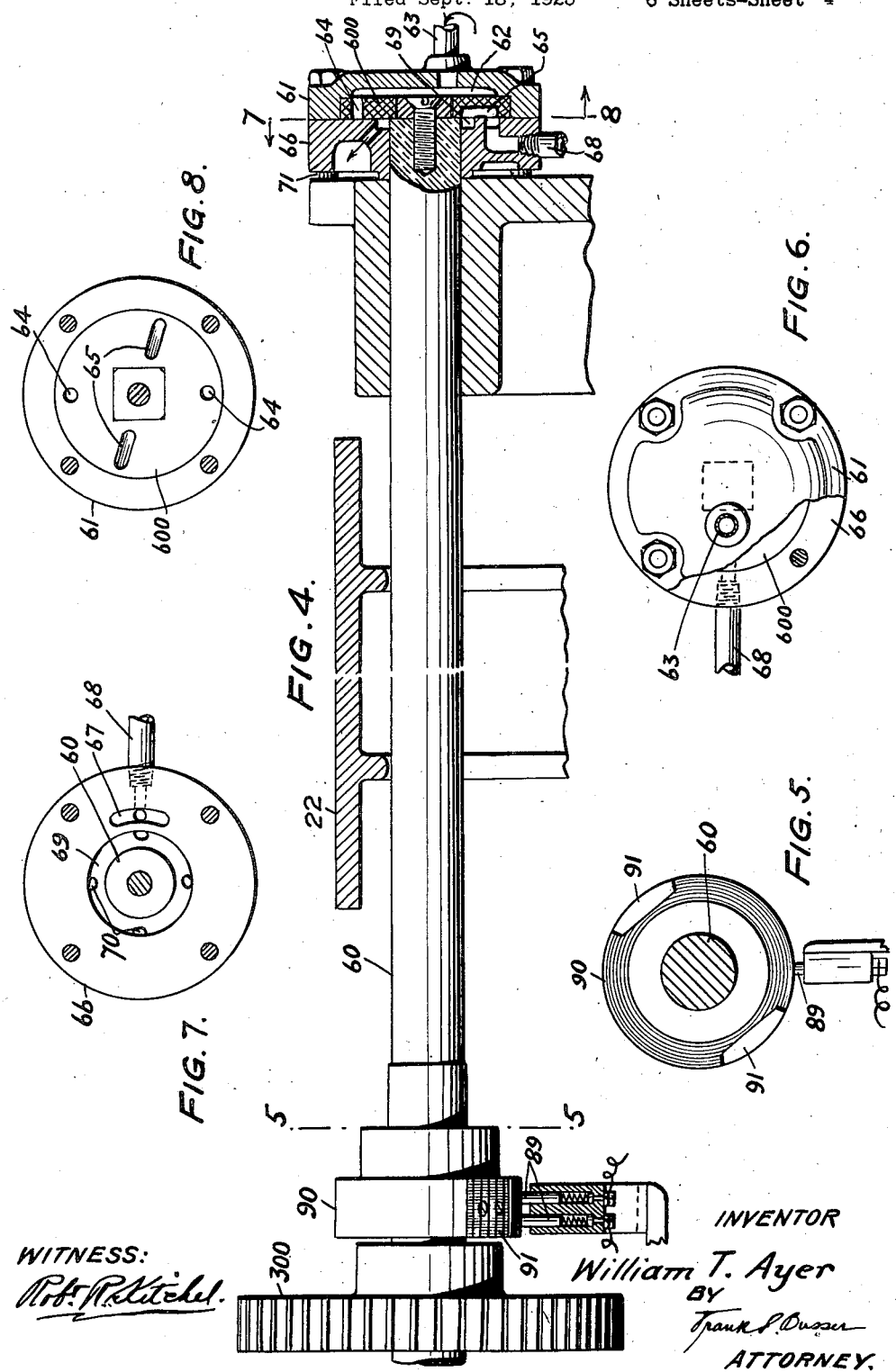
WITNESS:
INVENTOR
William T. Ayer
BY
Frank S. Busser
ATTORNEY.

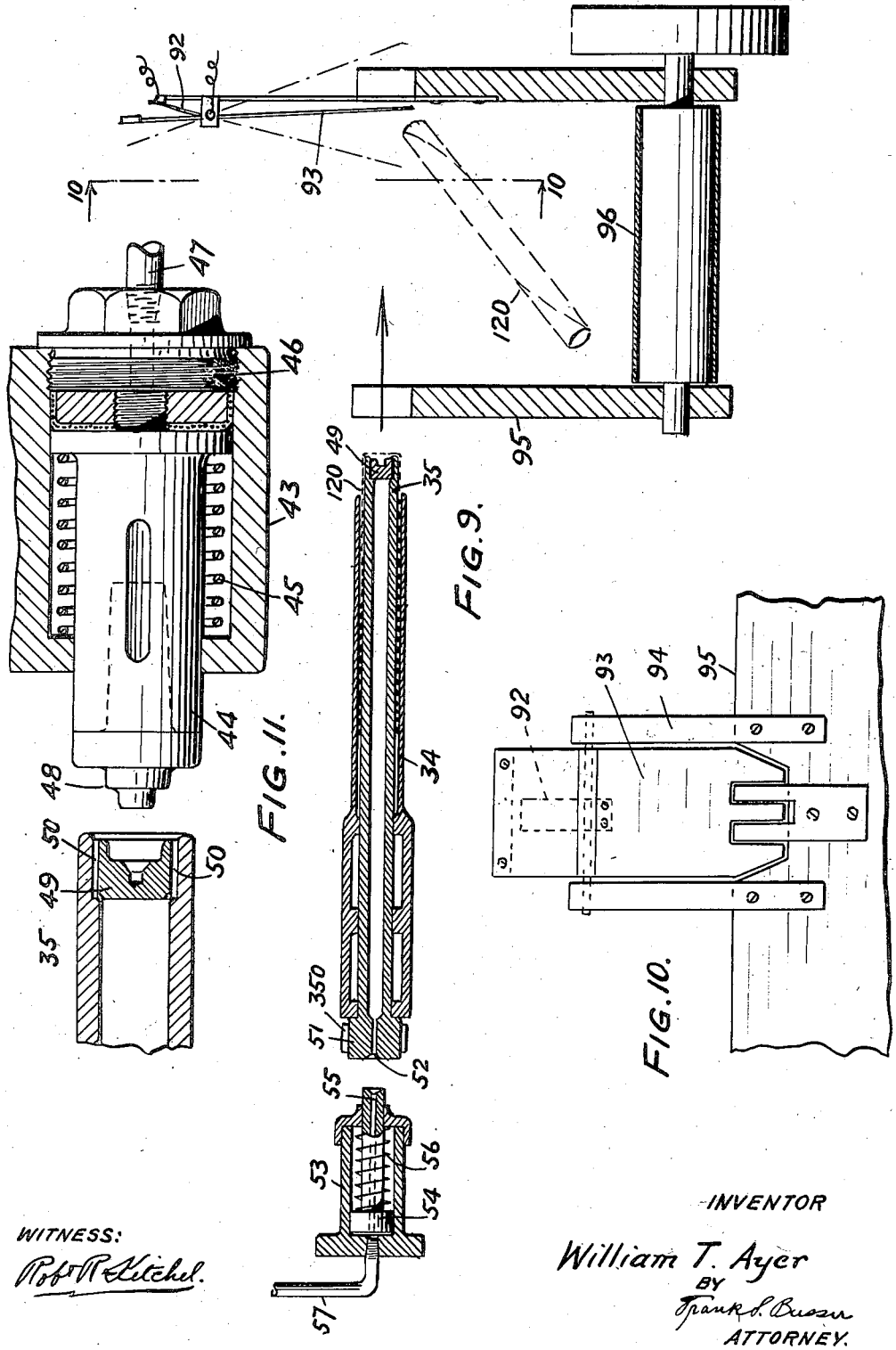

March 9, 1926.
W. T. AYER
1,575,894
MACHINE FOR MAKING PAPER SHELLS
Filed Sept. 18, 1923    6 Sheets-Sheet 6
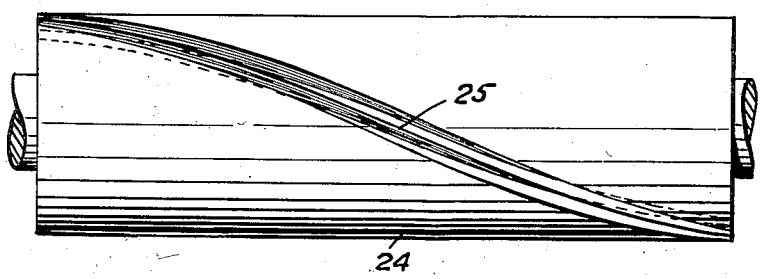 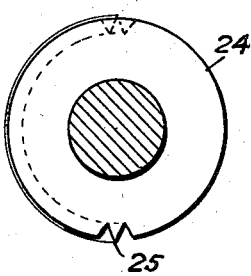
FIG.12.    FIG.13.
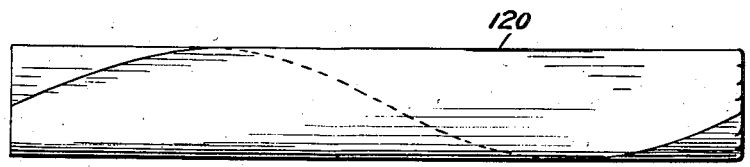
FIG.14
FIG.15.
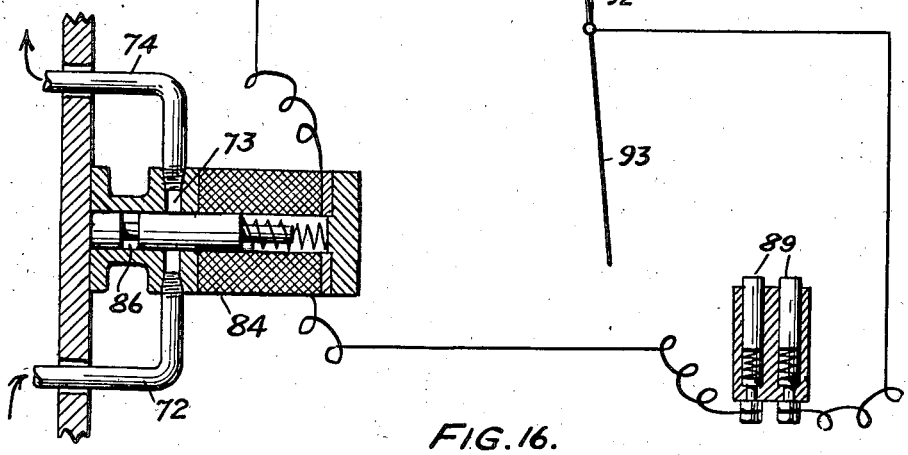
FIG.16.
INVENTOR
William T. Ayer
BY
Frank S. Busser
ATTORNEY.
WITNESS:
Rob't R. Mitchel.

Patented Mar. 9, 1926.

1,575,894

UNITED STATES PATENT OFFICE.

WILLIAM T. AYER, OF WILMINGTON, DELAWARE, ASSIGNOR TO HERCULES POWDER COMPANY, OF WILMINGTON, DELAWARE, A CORPORATION OF DELAWARE.

MACHINE FOR MAKING PAPER SHELLS.

Application filed September 18, 1923. Serial No. 663,367.

*To all whom it may concern:*

Be it known that I, WILLIAM T. AYER, a citizen of the United States, residing at Wilmington, county of New Castle, and State of Delaware, have invented a new and useful Improvement in Machines for Making Paper Shells, of which the following is a full, clear, and exact description, reference being had to the accompanying drawings, which form a part of this specification.

The object of my invention is to provide a machine for making shells with a tubular body closed at one end, from a continuous roll of paper. The main object of my invention is not to increase the production of a single machine as compared with known shell forming machines, but to so simplify the machine that its production relative to its expense of manufacture will be substantially greater than that of known machines, thereby decreasing the unit cost of production. The machine comprises various novel features, the more important of which are the means for cutting the continuously moving sheet into separate blanks, the arrangement for starting the winding of a blank upon a mandrel before it is completely cut away from the sheet, the pneumatic ejecting mechanism, and the automatic stop mechanism and the means for causing it to operate in case the ejector fails to operate synchronously with the shell forming means.

In the drawings, which show a preferred embodiment of the invention,

Fig. 2 is a vertical section through the printing rolls, cutting rolls and mandrel drum.

Fig. 3 is a plan of the machine.

Fig. 4 is a detail view of the counter shaft that rotates the Geneva driver and carries the valve mechanism for controlling the air passages to and from the crimper, ejector and stop mechanism.

Fig. 5 is a section on the line 5—5 of Fig. 4.

Fig. 6 is an end view of the valve mechanism of Fig. 4.

Fig. 7 is a section on the line 7—8 of Fig. 4 looking toward the left.

Fig. 8 is a section on the line 7—8 of Fig. 4 looking toward the right.

Fig. 9 is a longitudinal section through the mandrel and its shield, and the ejector cylinder and piston, showing also a side view of the baffle plate that is periodically operated by ejected shells, and a section through the conveyor for ejected shells.

Fig. 10 is a front view of the baffle plate and its support.

Fig. 11 is a sectional view of the end of a mandrel and the crimper.

Figs. 12 and 13 are respectively a side view and an end view of the cutter roll.

Fig. 14 is a side view of a completed shell.

Fig. 15 is a cross-section through the shell body.

Fig. 16 is a longitudinal section through the solenoid controlling the air passage to the stop mechanism and a diagram of the electric circuit to the solenoid.

Figure 1:
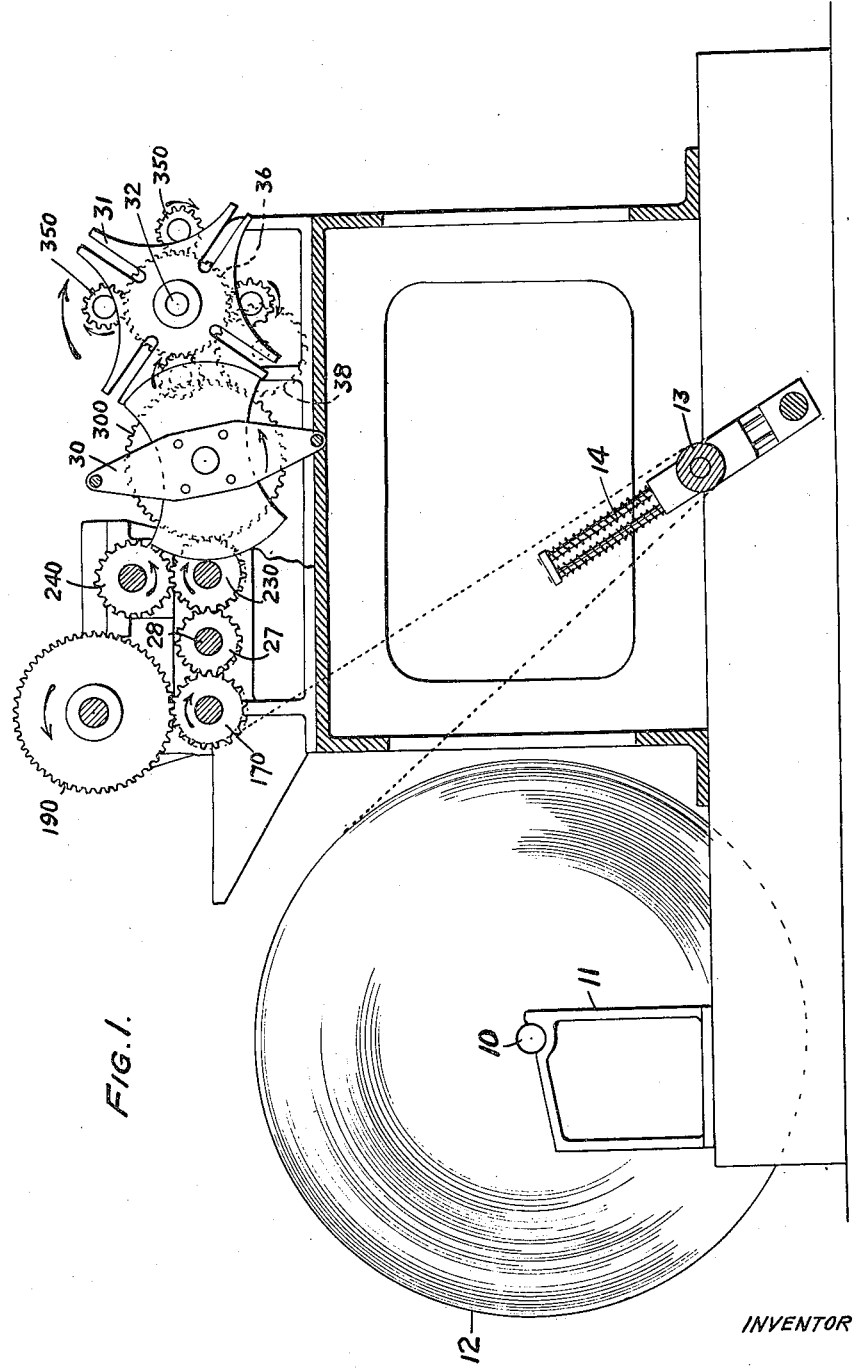
Fig. 1 is a side view of the machine on a reduced scale with many structural details omitted.

The stock shaft 10 (see Fig. 1), supported on brackets 11, carries the roll of paper 12, which is fed to the printing and cutting devices around a tension roller 13 slidably supported on spring-pressed rods 14. Roll 13 prevents the breaking of the paper when the machine is started. Such breakage might otherwise occur, due to the inertia of the heavy roll of paper.

From the tension roller the paper passes through a paper guide 15 (see Fig. 2) with adjustable caps, onto a blanket roll 17 with a rubber covering 18 and thence between this roll and a roll 19. The guide 15 corrects the position of the sheet, which position would otherwise slightly vary, due to the fact that the rolls of paper are not often perfectly wound.

Roll 19 carries electrotypes 20, which are held in position by means of clamps 21. As the paper passes under roll 19, the required label is imprinted on it, first by one electrotype and then by the other.

The paper thence passes along the top of the table 22 and between rolls 23 and 24. Roll 23 is a hardened anvil roll. Roll 24 is of hardened steel and is provided with a knife 25 (see Figs. 12 and 13) whose lengthwise extension is spiral relative to the roll, as best shown by the detail view Fig. 12. The knife projects to a height above the surface of the roll about equal to twice the thickness of a sheet of paper, as shown in Fig. 13. The knife 25 may be formed on the roll by machining the solid metal, or it may be an inserted knife. In passing between rolls 23 and 24, the paper is cut across obliquely, as shown at 26 in Fig. 3.

The shafts of rolls 17 and 23 carry gear wheels 170 and 230 (see Fig. 1), which are driven from a pinion 27 on the driving shaft 28 carrying a driving pulley 29 (see Fig. 3). The gear wheel 170 drives a gear wheel 190 on the shaft of roll 19. The gear wheel 230 engages a gear wheel 240 on the shaft of roll 24.

The gear wheel 230 also engages a gear wheel 300 on the shaft of a Geneva driver 30. This driver engages a Geneva follower 31 on the drum shaft 32. The Geneva drive operates to turn the drum shaft a quarter revolution, and then hold it stationary for a length of time equal to that occupied by its turning movement.

On the shaft 32 is a drum body 33, on which are detachably mounted four slotted mandrel shields 34, which turn bodily with the drum but have no rotary movement on their axes. Extending within the respective mandrel shields 34 are four hollow mandrels 35, which are continuously rotated on their axes. To effect their rotation the mandrel shafts carry pinions 350 (see Figs. 1 and 3), which all engage a gear wheel 36. On the shaft of gear wheel 36 is another gear wheel 37 (see Fig. 3), which, through a pinion 38, is driven by the gear wheel 300. A longitudinal sectional view of one of these mandrels 35 and its shield 34 is shown in Fig. 9. The mandrels and their shields are so designed that they can be readily removed and replaced by mandrels and shields of different diameters, thus making it possible to manufacture shells of different diameters on the same machine.

The mandrel shields 34 are slotted to allow tension rolls 39 to extend through them and contact with the mandrels 35. There are two sets of these tension rolls (see Figs. 2 and 3) engaged with each mandrel. Each set of tension rolls is mounted on a shaft supported on a lever 40, the two levers actuating the two sets of rolls contacting with one mandrel being acted upon by springs 41 to hold the rolls in contact with the mandrel.

While the paper is being severed by the cutter roll 24, the most advanced end of the edge formed by the immediately preceding cut of the paper extends into the slot of that one of the four mandrel shields 34 which, at this time, is held stationary, at position A, just beyond the end of the table 22. It is immediately engaged by the mandrel 35 and one of the pressure rolls 39 on one of the two sets of such rolls. By reason of the mandrel being rotated at the same surface speed at which the sheet is moving between rolls 17 and 19 and rolls 23 and 24, the paper is wound on the mandrel at the same speed at which it travels toward it. While winding on the mandrel, the cutter roll completes the severance of the paper.

It is necessary to have at least two pressure rolls 39 on each shaft, and it is desirable to have three, so that the same mandrel can handle wide or narrow sheets. Thus, by references to Fig. 3, where a wide sheet is shown as about to pass toward the mandrel, the advance edge of the paper will be engaged first by the left-hand pressure roll, then by the mediate pressure roll and then by the right-hand pressure roll. If the sheet is substantially narrower, the left-hand pressure roll will be inoperative and the edge of the sheet will be engaged successively by the mediate pressure roll and the right-hand pressure roll.

At the moment when the sheet is completely severed, the action of the Geneva driver causes the drum 33 to turn, carrying the mandrel that has just received the sheet from position A through an arc of ninety degrees to position B, where the drum is again brought to rest. Simultaneously, the mandrel that was in position D is brought to position A to receive the next blank. During the movement from position A to position B the mandrel continues to roll up the sheet until, shortly after reaching position B, it is completely wound into a tube 120, open at both ends, one open end projecting beyond the mandrel. This tube is shown in cross-section in Fig. 15.

Secured in fixed position between positions B and C is a multiple fingered folder 42 of conventional construction. At the next quarter turn of the drum, the projecting end of the tube that is being carried from position B to position C engages successively the fingers of the folder, thereby folding in the projecting end of the tube in a number of overlapping folds in a manner well known in the art.

When the tube 120 with the folded end reaches position C, it is brought opposite a crimper, which is shown in detail in Fig. 11. This crimper comprises a cylinder 43, a piston 44, a spring 45 that normally holds the piston retracted, and a cylinder head 46. The head has an orifice extending therethrough to the face of the piston and communicating with pipe 47 communicating with a source of air under pressure. It will be observed, by reference to Figs. 9 and 11, that the mandrel 35 has a head 49 having a depression in its exposed end and that the piston 44 has a corresponding projection 48. When a tube 120 is brought to rest opposite the crimper, a blast of air entering through pipe 47 and the orifice in head 46 forces the piston 44 forward, causing its projection 48 to press the overlapping folded ends of the tube into the depression in the end head 49 of the mandrel, with sufficient force to produce a permanent concave bottom in the tube, and forming the shell 120 in the final shape shown in Fig. 14.

When the completed shell reaches position D, it is brought opposite an ejector. By reference to Fig. 11, it will be noted that the hollow interior of a mandrel 35 communicates with air vents 50 formed in the periphery, and extending longitudinally, of the head 49 of the mandrel. The opposite head 51 of the mandrel, carrying pinion 350, is provided with an axial orifice 52. See Fig. 9. The ejector comprises a cylinder 53 and a piston 54 normally held retracted by a spring 56 and provided with an orifice 55 extending from end to end thereof. The end head of the cylinder is provided with an orifice communicating with an air blast pipe 57. When a mandrel is brought to rest opposite the ejector, a blast of air through pipe 57 forces piston 54 against the head 51 of the mandrel, whereupon air under pressure passes through orifices 55 and 52, the hollow interior of the mandrel and the orifices 50, striking the closed end of the shell 120 and forcibly projecting the shell in the direction shown by the arrow to entirely free it from its mandrel.

Before the shell can be ejected from the mandrel, as just described, it is necessary to retract the pressure rollers 39 which are pressing the shell against the mandrel. This is effected by means of a stationary cam 58 (shown in the form of an eccentric, Fig. 2), with which the levers 40 carrying the two sets of rollers engage in the passage of the corresponding mandrel from position C to position D, thereby simultaneously retracting both sets of rollers. In passing from position D to position A, the levers 40 pass out of engagement with the cam and the springs 41 return them to normal position.

The valve mechanism for controlling the admission of air to, and exhaust of air from, the crimper and the ejector is shown in Figs. 4, 6, 7 and 8. The shaft 60 carrying at one end the gear 300 carries at its other end a valve 600, which turns in a recess in a fixed end head 61 and contacts with a valve seat 66. The head and seat contact at their peripheries and are bolted to the machine frame. The head 61 is recessed to form a chamber 62, which is in constant communication with a pipe 63 connected with a source of compressed air. The face of the valve 600 that contacts with the seat 66 (see Fig. 8) has two diametrically opposite holes 64 in constant communication with chamber 62 and two diametrically opposite radial grooves 65. In the opposing face of seat 66 (see Fig. 7) are an arcuate groove 67 communicating with a pipe 68 and an annular groove 69 in constant communication with the grooves 65 and also, through holes 70, with a recess 71 opening to the atmosphere.

When, in the rotation of shaft 60, a hole 64 is brought opposite groove 67, compressed air passes into pipe 68; and when a groove 65 is brought opposite groove 67, air is exhausted from pipe 68 through grooves 65 and 69 and hole 70 to the atmosphere.

From pipe 68 (see Fig. 3) branch the previously described pipes 47 and 57 leading respectively to the crimper and the ejector. Another branch pipe 72 leads to a solenoid 84 (see Fig. 16) and communicates with one end of a diametrical orifice 73 therein, the other end of orifice 73 communicating with a pipe 74. Pipe 74 extends to the head of a cylinder 75 (see Fig. 3), in which is a piston 76 which is connected with a clutch lever 78, pivoted at 79 and carrying a clutch member 80, which engages a clutch member 81 on the driving pulley 29. A spring 77 within the cylinder 75 normally holds the piston 76 in position to hold the clutch members 80 and 81 in driving relation. The clutch lever is, of course, manually operable to disengage the clutch, but it is also desired to disengage the clutch automatically and stop the machine in case, due to defective operation of the machine, it fails to eject shells at regular intervals. This is effected by causing compressed air to be admitted to pipe 74. Normally, compressed air is excluded from pipe 74, because communication with pipe 72 is normally closed by reason of the core 85 of the solenoid 84 (see Fig. 16) normally blocking the passage of air through orifice 73. When, however, the solenoid 84 is energized, its core 85 is drawn into position to bring an annular groove 86 therein in line with the passage 73, allowing compressed air to flow through pipe 74 to the head of piston 76 and push the piston, against its spring 77, to move the clutch lever 78 into position to retract the clutch member 80, thereby stopping the machine.

The automatic stop for the machine therefore requires that the solenoid 84 be energized. The solenoid is in an electric circuit comprising a transformer 87 in operative relation with a main circuit 88, an automatically operable switch 92, and a pair of spaced apart brushes 89, 89. To energize the solenoid requires the simultaneous closure of the circuit through switch 92 and brushes 89, 89. In the normal operation of the machine, the circuit is closed at these two points alternately with an interval during which the circuit is open at both points, so that one or the other, or both, of these connections are always open. The solenoid 84 is, therefore, normally at all times deenergized.

To intermittently connect the brushes 89, 89, I provide a commutator 90 (see Figs. 4 and 5) on the shaft 300. The commutator is provided with two diametrically opposite conducting faces 91 each extending around about one-sixth of the circumference.

The intermittent closure of the switch 92 is effected by means of a light baffle plate 93 (see Figs. 9 and 10), which is pivotally supported on trunnions and carries the switch 92. As a shell 120 is discharged from a mandrel 35 by the ejector, it strikes the baffle and drops down onto a belt conveyor 96. The trunnions of the baffle are supported between uprights 94 secured to a part of the conveyor trough 95.

The impact of a shell causes the baffle 93 to swing into position to open the switch 92. The center of gravity and the weight of the baffle are so calculated that, acting as the well known compound pendulum, the baffle does not return to its normal switch-closing position until approximately two-thirds of the period before the next shell will strike it has elapsed. During this period, commutator 90 starts to close the circuit through brushes 89, 89, but again opens the circuit before the baffle returns to normal position.

If shells fail to be ejected from the machine at synchronous intervals, it is clear that the baffle 93 will remain in circuit-closing position until the circuit is closed, through brushes 89, 89, by the commutator 90. This closes the circuit through the solenoid 84, energizes its core 84, opens communication between pipes 72 and 74, allows admission of compressed air to the piston 76, and operates the clutch lever 78 to disengage the clutch members 80 and 81, thus stopping the machine.

A machine constructed in accordance with my invention, besides being cheap to construct in comparison with the best type of machine of duplex construction, occupies but a fraction of the floor space occupied by such prior machine. The capacity of my machine may be readily increased by developing it into a duplex machine (which involves virtually mere duplication), and it will still be relatively cheap to build and will have a superior capacity and occupy less floor space.

I have not herein claimed the mechanism for cutting blanks specifically illustrated in Figs. 12 and 13, as the same forms the subject-matter of a divisional application.

Having now fully described my invention, what I claim and desire to protect by Letters Patent is:

1. In a machine for making paper shells, the combination with a rotary device for cutting diagonally an advancing sheet of paper into a series of blanks, of a rotary mandrel adapted to be engaged by the advanced part of the cut edge of the paper before the cutter has completed the next cut.

2. In a machine for making paper shells, the combination with a rotary device for cutting diagonally an advancing sheet of paper into a series of blanks, of a rotary mandrel adapted to be engaged by the advanced part of the cut edge of the paper while the cutting device is effecting the next cut.

3. In a machine for making paper shells, the combination with a pair of rolls between which the paper passes, one of said rolls being provided with a spirally arranged cutter adapted to cut the advancing sheet obliquely, of a rotary mandrel in advance of said rolls, and means for rotating the mandrel and the rolls at the same surface speed, the mandrel being positioned at such a distance from the rolls that the advanced part of the front cut edge of a blank engages the mandrel while the cutter is severing the blank at the rear and before it has completed the cut.

4. In a machine for making paper shells, the combination with a device for cutting obliquely an advancing sheet of paper into a series of blanks, of a rotary mandrel in advance of the cutter, and a pair of pressure rollers on a common axis, said rollers adapted to successively engage the blank and press it against the mandrel as it is wound thereabout, the blank being engaged by one roller before the cutter has severed the rear of the blank.

5. In a machine for making paper shells, the combination with a device for cutting obliquely an advancing sheet of paper into a series of blanks, of a rotary mandrel in advance of the cutter, a mandrel shield surrounding the mandrel, and a pair of pressure rollers on a common axis, there being slots in the shield to allow the rollers to successively engage the blank as it enters the shield and press it against the mandrel as it is wound thereabout, the blank being engaged by one roller before the cutter has severed the rear of the blank.

6. In a machine for making paper shells, the combination with a device for cutting obliquely an advancing sheet of paper into a series of blanks, of a rotary mandrel in advance of the cutter, and three pressure rollers on a common axis, said rollers being adapted to engage a relatively wide blank and press it against the mandrel as it is wound thereabout, the construction being such as to handle a relatively narrow blank, in which case the first of said rollers is inoperative and the remaining rollers are adapted to engage the blank successively.

7. In a machine for making paper shells, the combination with a device for cutting obliquely an advancing sheet of paper into a series of blanks, of a rotary mandrel in advance of the cutter, and three pressure rollers on a common axis, said rollers being adapted to engage a relatively wide blank and press it against the mandrel as it is wound thereabout, the construction being such as to handle a relatively narrow blank, in which case the first of said rollers is inoperative and the remaining rollers are adapted to engage the blank successively, the middle pressure roller being positioned at such distance from the cutter that the latter will not complete the severance of the blank until the last named roller has engaged the blank.

8. In a machine for making paper shells, the combination of a mandrel drum and means to impart to it a step-by-step movement of rotation, mandrels adapted to be bodily turned with the drum, means to rotate the mandrels on their axes, means to feed a blank to a mandrel while the drum stops in one position, the mandrel winding upon the drum to form a tube while the latter is turning to its next position of rest, a folder adapted to fold in the end of the tube while the drum is turning from one position to another, a crimper adapted to act upon the folded end of the drum while the latter is in a position of rest, and an ejector adapted to drive the shell from its mandrel while the drum is in another position of rest.

9. In a machine for making paper shells, the combination of a mandrel drum and means to impart to it a step-by-step movement of rotation, mandrels adapted to bodily turn with the drum, means to feed a blank to a mandrel while the drum stops in one position, means to rotate the mandrels on their axes, pressure rollers for each mandrel between which and the mandrel the blank is wound to form a tube, a spring-pressed device by which the rollers are carried, means to fold and crimp an end of the blank, a cam adapted to engage said device and retract the rollers, and means to eject the blank from the mandrel after its rollers are so retracted.

10. In a machine for making paper shells, the combination of a hollow mandrel about which the blank is wound to form a tube, and means to fold, crimp and close one end of the tube to form a shell, the closed end of the shell overlying one end of the mandrel, the end of the mandrel adjacent the closed end of the shell being closed except for air channels opening to the interior of the mandrel adjacent its inner wall, and means to admit compressed air to the interior of the mandrel, whereby air passes through said channels and strikes against that part of the closed end of the shell adjacent its tubular wall and ejects the shell from the mandrel.

11. In a machine for making paper shells, the combination of a hollow mandrel about which the blank is wound to form a tube and means to fold, crimp and close one end of the tube to form a shell, the closed end of the shell overlying one end of the mandrel, which end is provided with an air vent, the opposite end of the mandrel having an air hole communicating with its hollow interior, a cylinder, a spring-pressed piston therein, there being an air hole extending through the piston, and means to intermittently admit compressed air behind the piston, thereby advancing the piston into contact with the mandrel and affording a passage for compressed air through the piston and mandrel to the closed end of the blank, thereby ejecting the latter from the mandrel.

12. In a machine for making paper shells, the combination with shell-forming means including a mandrel, of an ejector adapted to discharge the shell from the mandrel, mechanism to stop the machine, means to operate the ejector synchronously with the shell-forming means, a pendulum-like baffle adapted to be engaged by successively ejected shells and to be moved by each such engagement away from its normal position and to then return to its normal position before its next engagement, an electric circuit, open at two points, means operable by the machine to close the circuit at one point at regular intervals, means operable by the baffle to close the circuit at the other point when it moves into normal position, said circuit closing operations being successive and the circuit being open at one point while it is closed at the other in the normal operation of the machine, the circuit being closed at both points simultaneously only when the ejector does not operate synchronously, an electro-magnet in the circuit which is energized when the circuit is closed, the energizing of said magnet releasing the stop mechanism.

13. In a machine for making paper shells, the combination with shell-forming means including a mandrel, of mechanism to stop the machine by the action of compressed air including an air passage, an ejector adapted to discharge the shell from the mandrel, means to operate the ejector synchronously with the shell-forming means, and means, dependent upon the synchronous operation of the ejector, to maintain said air passage blocked.

14. In a machine for making paper shells, the combination with shell-forming means including a mandrel, of mechanism to stop the machine, an electro-magnet adapted when energized to render said mechanism operative, an electric circuit in which the magnet is included, an ejector adapted to discharge the shell from the mandrel, means to operate the ejector synchronously with the shell-forming means, and means dependent upon the synchronous operation of the ejector to maintain said circuit open.

15. In a machine for making paper shells, the combination of shell-forming means including a mandrel of mechanism to stop the machine, an ejector adapted to discharge the shell from the mandrel, means to operate the ejector synchronously with the shell-forming means, an electro-magnet adapted when energized to render said stop mechanism operative, an electric circuit including said magnet and open at two points, means operable by the machine to close the circuit at one point at regular intervals, and means normally closing the circuit at another point but operable by ejected shells at regular intervals to open the circuit at that point while it is closed at the other point, the circuit being closed at both points simultaneously only upon failure of the ejector to operate synchronously.

In testimony of which invention, I have hereunto set my hand, at Wilmington, Delaware, on this fourteenth day of September, 1923.

WILLIAM T. AYER.